US012636826B2

(12) United States Patent
Van Os et al.

(10) Patent No.: US 12,636,826 B2
(45) Date of Patent: May 26, 2026

(54) MULTI-MATERIAL PRINTING FOR PRODUCING A 3D ITEM WITH INTERPENETRATING LAYERS

(71) Applicant: SIGNIFY HOLDING B.V., Eindhoven (NL)

(72) Inventors: Jacobus Petrus Johannes Van Os, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 110 days.

(21) Appl. No.: 17/908,894

(22) PCT Filed: Mar. 1, 2021

(86) PCT No.: PCT/EP2021/055042
§ 371 (c)(1),
(2) Date: Sep. 1, 2022

(87) PCT Pub. No.: WO2021/175780
PCT Pub. Date: Sep. 10, 2021

(65) Prior Publication Data
US 2023/0085962 A1     Mar. 23, 2023

(30) Foreign Application Priority Data
Mar. 5, 2020     (EP) ..................................... 20161244

(51) Int. Cl.
*B29C 64/118*          (2017.01)
*B29C 64/188*          (2017.01)
(Continued)

(52) U.S. Cl.
CPC .......... *B29C 64/118* (2017.08); *B29C 64/188* (2017.08); *B33Y 10/00* (2014.12); *B33Y 80/00* (2014.12)

(58) Field of Classification Search
None
See application file for complete search history.

(56) References Cited

U.S. PATENT DOCUMENTS 9,498,919 B2 * 11/2016 Carr ....................... B33Y 50/02
10,449,716 B2 * 10/2019 Hikmet .................. B33Y 10/00
(Continued)

FOREIGN PATENT DOCUMENTS

CN          105992687 A     10/2016
CN          106103054 A     11/2016
(Continued)

OTHER PUBLICATIONS

Dinwiddie, Ralph B., et al. "Infrared imaging of the polymer 3D-printing process." Thermosense: thermal infrared applications XXXVI . vol. 9105. SPIE, Jun. 12, 2014. (Year: 2014).*

*Primary Examiner* — Benjamin A Schiffman

(57)          ABSTRACT

The invention provides a method wherein single layers of a wall element, consist of two (or more) strands. One of the strands is located at one side of the layer and another one of the strands is arranged at the other side of the layer. However, at one or more positions these sides may be changed. In this way, e.g. color, reflectivity, transmissivity, and or other optical properties may be controlled. Further, a strong(er) layer may be obtained. Printing becomes more flexible, as the two strands may essentially be printed continuously. There will thus be change positions within the layer where one strand is over the other, or vice versa. In order not to increase layer thickness (at those change positions), as all strands are within the same layer, at the change positions the layer thickness of the strands may be decreased. In specific embodiments, there may be a temporary stop during printing of one of the strands at the change position to provide space for the future strand. A kind of woven structure may be obtained, which may also provide
(Continued)

strength. Especially, one of the strands may be transmissive for visible light. This may provide a light transmissive single layer, or a light transmissive wall element.

10 Claims, 8 Drawing Sheets

(51) Int. Cl.
B33Y 10/00 (2015.01)
B33Y 80/00 (2015.01)

(56) References Cited

U.S. PATENT DOCUMENTS

| | | | | |
|---|---|---|---|---|
| 10,539,950 | B2 * | 1/2020 | Jin | G05B 19/4099 |
| 10,611,098 | B2 * | 4/2020 | Stolyarov | B29C 64/209 |
| 11,518,095 | B2 * | 12/2022 | Hikmet | B33Y 80/00 |
| 2015/0197060 | A1 | 7/2015 | Carr et al. | |
| 2015/0266235 | A1 | 9/2015 | Page | |
| 2015/0352783 | A1 | 12/2015 | Snyder et al. | |
| 2016/0107379 | A1 | 4/2016 | Mark et al. | |
| 2016/0136901 | A1 | 5/2016 | Pettis et al. | |
| 2016/0339633 | A1 | 11/2016 | Stolyarov et al. | |
| 2016/0342150 | A1 | 11/2016 | Jin et al. | |
| 2017/0043532 | A1 | 2/2017 | Carr et al. | |
| 2017/0136706 | A1 | 5/2017 | Hakkaku | |
| 2018/0015668 | A1 | 1/2018 | Koskas et al. | |
| 2018/0093412 | A1 | 4/2018 | Snyder et al. | |
| 2018/0236712 | A1 * | 8/2018 | Hikmet | B33Y 80/00 |
| 2020/0122386 | A1 * | 4/2020 | Hikmet | F21V 7/00 |
| 2020/0139616 | A1 * | 5/2020 | Hikmet | B33Y 70/10 |
| 2020/0223130 | A1 * | 7/2020 | Koopmans | B33Y 70/10 |
| 2021/0101330 | A1 * | 4/2021 | Hikmet | B29C 64/106 |
| 2021/0114295 | A1 * | 4/2021 | Hikmet | B29C 64/209 |
| 2021/0138721 | A1 * | 5/2021 | Hikmet | B33Y 80/00 |
| 2021/0154913 | A1 * | 5/2021 | Hikmet | B29C 64/209 |
| 2021/0197444 | A1 * | 7/2021 | Van Hal | B33Y 70/00 |
| 2022/0032535 | A1 * | 2/2022 | Hikmet | B29C 64/118 |
| 2022/0063184 | A1 * | 3/2022 | Hikmet | B29C 64/209 |
| 2022/0143901 | A1 * | 5/2022 | Hikmet | B29C 64/118 |
| 2022/0410468 | A1 * | 12/2022 | Hikmet | F21K 9/90 |
| 2022/0413201 | A1 * | 12/2022 | Hikmet | G02B 6/0003 |
| 2023/0071919 | A1 * | 3/2023 | Hikmet | B33Y 30/00 |
| 2023/0085962 | A1 * | 3/2023 | Van Os | B29C 64/188 |
| 2023/0097548 | A1 * | 3/2023 | Hikmet | B33Y 80/00 |
| | | | | 359/896 |
| 2023/0271379 | A1 * | 8/2023 | Van Bommel | B29C 64/336 |
| | | | | 264/308 |
| 2023/0302719 | A1 * | 9/2023 | Hikmet | B33Y 70/10 |
| 2023/0302720 | A1 * | 9/2023 | Hikmet | D02J 13/005 |
| 2023/0311405 | A1 * | 10/2023 | Hikmet | B29C 64/118 |
| | | | | 428/212 |
| 2024/0009926 | A1 * | 1/2024 | Van Bommel | B33Y 10/00 |

FOREIGN PATENT DOCUMENTS

| | | | |
|---|---|---|---|
| CN | 106163581 A | 11/2016 |
| CN | 107073815 A | 8/2017 |
| CN | 107571491 A | 1/2018 |
| CN | 107571491 B | 6/2018 |
| CN | 108290348 A | 7/2018 |
| CN | 109624309 A | 4/2019 |
| CN | 110023793 A | 7/2019 |
| WO | 2015156877 A2 | 10/2015 |
| WO | 2015188017 A1 | 12/2015 |
| WO | 2018017330 A1 | 1/2018 |
| WO | 2019215041 A1 | 11/2019 |

* cited by examiner

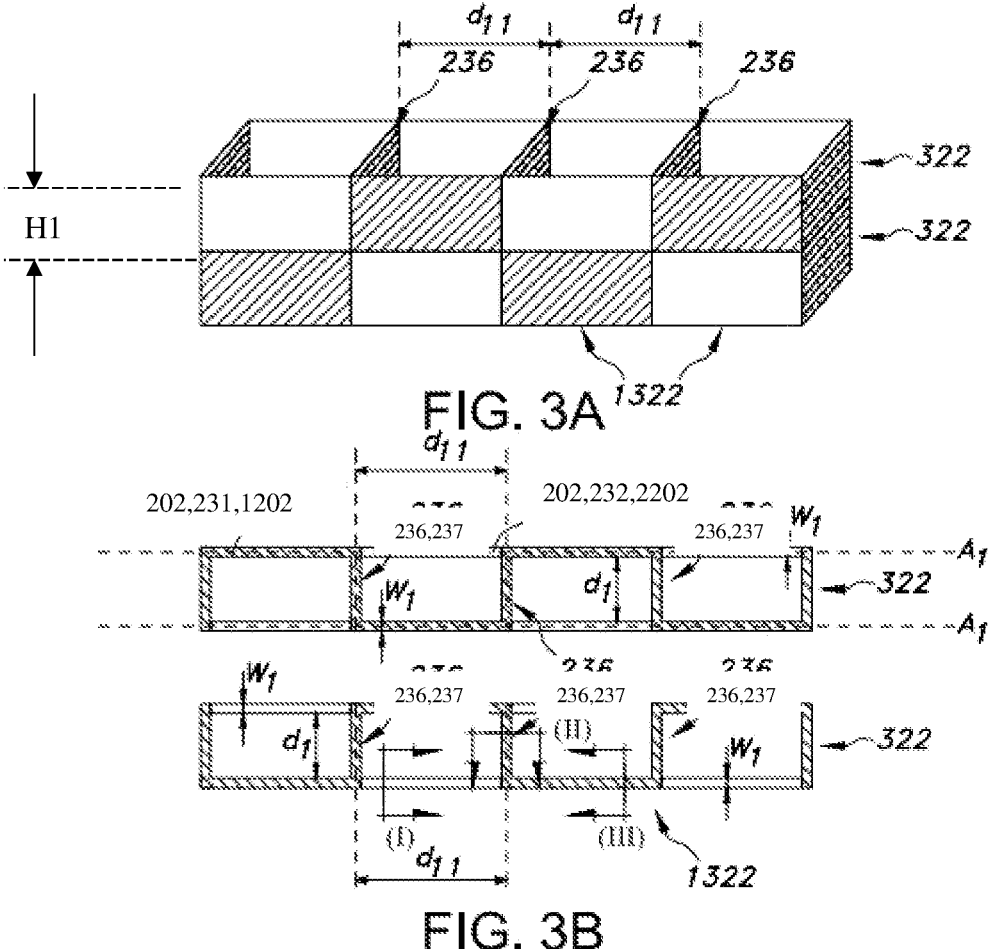
FIG. 3A
FIG. 3B
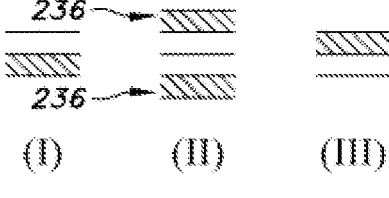
(I)          (II)          (III)
FIG. 3C

MULTI-MATERIAL PRINTING FOR PRODUCING A 3D ITEM WITH INTERPENETRATING LAYERS

CROSS-REFERENCE TO PRIOR APPLICATIONS

This application is the U.S. National Phase application under 35 U.S.C. § 371 of International Application No. PCT/EP2021/055042, filed on Mar. 1, 2021, which claims the benefit of European Patent Application No. 20161244.7, filed on Mar. 5, 2020. These applications are hereby incorporated by reference herein.

FIELD OF THE INVENTION

The invention relates to a method for manufacturing a 3D (printed) item. The invention also relates to the 3D (printed) item obtainable with such method. Further, the invention relates to a lighting device including such 3D (printed) item.

BACKGROUND OF THE INVENTION

The 3D printing articles including spatially different properties is known in the art. US2018/0093412, for instance, describes a method of printing a 3D article comprising selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article. In some cases, the first region of support material forms a grayscale pattern and/or a CMY color pattern in combination with the first region of build material and/or the second region of build material.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It appears that making use of at least two materials is desirable. For instance, it may be desirable for obtaining surface textures, for obtaining an attractive appearance, for controlling color and/or other optical properties. Further, mechanical properties may be controlled. However, during printing for example of an object using e.g. two colors, nozzles printing different colors may have to continuously start and stop printing at different locations to print the desired colors in the same layer. This may then be repeated going from one layer to the other to produce a pattern. This may cost time and changing materials, such as differently colored materials, in a layer may induce defects. Furthermore, making small patterns is difficult.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Hence, in a first aspect the invention provides a method for producing a 3D item by means of fused deposition modelling. Especially, the method comprises a 3D printing stage comprising layer-wise depositing 3D printable material to provide the 3D item comprising 3D printed material. Especially, this may be executed on a receiver item (or on an already printed layer on such receiver item, as will be clear to a person skilled in the art). Especially, the 3D item comprises one or more layers of 3D printed material. A first layer part (note that here "first" only is used to indicate a layer, but this "first" does not mean that this layer is 3D printed first) of the one or more layers comprises at least two neighboring strands ("at least two strands") of 3D printed material. Especially, the method comprises: providing by 3D printing a first strand of first 3D printed material and a second strand of second 3D printed material neighboring to each other. Further, the method may comprise providing by 3D printing a first strand of first 3D printed material and a second strand of second 3D printed material neighboring to each other, while (also) swapping during 3D printing at one or more first positions ("change positions") within the first layer part an arrangement of the strands relative to each other. Further, in specific embodiments at least one of the first 3D printed material and the second 3D printed material is transmissive for visible light.

Hence, the invention provides in specific embodiments a method for producing a 3D item by means of fused deposition modelling.

The 3D item comprises one or more layers of 3D printed material, a first layer part of the one or more layers comprising a first strand of first 3D printed material in a first plane and a second strand of second 3D printed material in a second plane, at least one of the first 3D printed material and the second 3D printed material being transmissive for visible light. The first and second planes may be parallel to the x-y-plane (or horizontal plane) of a receiver plate onto which the 3D item was produced.

The method comprises a 3D printing stage comprising layer-wise depositing 3D printable material to provide the 3D item.

During the 3D printing stage, the first strand of first 3D printed material and the second strand of second 3D printed material are deposited so that at a plurality of positions in a cross-sectional view parallel to the first plane and the second plane, the first strand and the second strand are available in a configuration wherein the first strand and the second strand are next to each other, either in direct contact or at a non-zero distance.

At one or more first positions within the first layer part, the configuration of the first strand and the second strand changes from a first configuration to a second configuration, different from the first configuration.

With such method, 3D printing of different materials may be more efficient than when printing the materials consecutively. Further, the 3D items obtained with such method may have less 3D printing effects, due to the possibility of essentially continuous printing. With such method properties of the 3D item may be controlled, as one may select parts of the 3D printed item wherein one of the strands is visible (and another strand is at an opposite side) and other parts of the item where another strand is visible (and the one strand is at the opposite side). Further, the present method may also allow spatial controlling of optical properties. Hence, a 3D printed item may be provided with spatially different properties, such as color and/or transmission (of light). Yet further, the present method may provide wall elements that may be transmissive for light, or wall elements of which one or more first parts are transmissive for light and one or more second parts are not transmissive for light or less transmissive for light, or have (yet) other optical properties than the one or more first parts. Further, wall elements may be provided with parts with different colors and/or different (colored) patterns. Herein, the invention is especially explained in relation to two strands. However, the method may also be applied with three or more strands. Likewise, a layer part of the printed 3D item may consist of two or more strands. Hence, with the present invention in embodiments a 3D item with interpenetrating layers is provided, which may especially be produced by multi-material printing.

As indicated above, the invention provides a method for producing a 3D item ("3D printed item", "item") by means of fused deposition modelling. This method will further be explained below, especially with some embodiments.

The method especially comprises a 3D printing stage comprising layer-wise depositing 3D printable material to provide the 3D item comprising 3D printed material. Hence, effectively 3D printed material is deposited as the 3D printable material when being extruded may become 3D printed material (on a receiver item). This 3D printed material is especially deposited on a receiver item (see also below); this may also include depositing on an earlier 3D printed layer on the receiver item. The produced 3D item especially comprises one or more layers of 3D printed material, even more especially a plurality of layers. Especially, the 3D item comprises a wall or wall part, which comprises these one or more layers. In embodiments, a first layer part of the one or more layers comprises at least two neighboring strands of 3D printed material. In other words, in a cross-sectional view parallel to the planes of the at least two strands, the at least two strands are available in a configuration wherein they are next to each other, either in direct contact or at a non-zero distance. The term "a first layer part" may also refer to a plurality of first layer parts. Further, the term "first layer part" may refer to a part of a layer but it may also refer to an entire layer. The term layer may especially refer to a direct deposition result on the receiver item on a single height. Hence, a layer on another layer is in general considered another layer (even when the result of continuous 3D printing).

Especially, the method may comprise providing by 3D printing a first strand of first 3D printed material and a second strand of second 3D printed material neighboring to each other, while swapping during 3D printing at one or more first positions within the first layer part an arrangement of the strands relative to each other. In other words, at one or more first positions within the first layer part, the configuration of the first and second strands changes from a first configuration to a second configuration, different from the first configuration. Hence, at least part of the layer is not produced by extruding 3D printable material and depositing a layer, but by extruding at least twice 3D printable material. In this way, two or more strands are produced which together form the layer. Hence, the two or more strands may define a height and a width of the layer, and a length of the first layer part. Therefore, a layer part, or an entire layer may in embodiments consist of at least two strands.

In embodiments, over one or more parts of the first layer part the strands may touch each other. Alternatively, or additionally, over one or more parts of the first layer part the strands may not touch each other. Alternatively, or additionally, over one or more parts of the first layer part one of the strands may partly overlap part of the other strand. For instance, this may be achieved by printing the other strand at a distance from the one strand less than the width of the other strand (or of the one strand). Hence, in embodiments two (or more) strands may be configured parallel but also be pressed together. Hence, in embodiments two or more strands may overlap over some length of the two or more (overlapping) strands.

Alternatively, or additionally, over one or more parts of the first layer part the strands may be configured parallel to each other. One or more parts of such neighboring configured strands may be parallelly curved, may have substantially the same shape, may have mirrored shapes, may have different shapes, etc.

The phrase "neighboring to each other" means that in a cross-sectional view parallel to the planes of the strands, the strands are in a configuration wherein they are next to each other, and it may thus include in physical contact or at some distance. The strands may thus be provided at a non-zero distance (d1) from each other. This non-zero distance may thus be larger than twice the individual widths of the strands. As indicated below, the individual widths may essentially be the same.

In embodiments the method may comprise providing at least one of the strands in a block-shape way, in a zig-zag way, or in a meandering way. Also, a combination of two or more of these ways may be applied. In yet further embodiments, the method may comprise providing the at least two strands in a way individually selected from a block-shape way, a zig-zag way, and a meandering way. Of course, also a combination of two or more of these ways may be applied for one of the strands or for two (or more) of the strands (such as e.g. a way in which a trapezium shape is obtained). The phrase "individually selected" indicates that the way chosen for the one strand may be different for another strand. Further, in embodiments the method may comprise providing the strands at a non-zero distance (d1) of each other at one or more second positions. Alternatively, or additionally, in embodiments the method may comprise providing the strands in physical contact with each other at one or more second positions. Alternatively, or additionally, in embodiments the first strand and the second strand may be configured in average parallel to each other.

Instead of the phrase "at least two strands", also the phrase "two or more strands" may be applied.

Further, as will be clear from the above, within the first layer part there may also be different configurations at different positions. Further, when there are more than one first layer parts, two or more of these may be provided in essentially the same way(s). However, in yet other embodiments two or more of these may be provided in different way(s).

In specific embodiments, the invention provides a method for producing a 3D item by means of fused deposition modelling, the method comprising a 3D printing stage comprising layer-wise depositing an extrudate comprising 3D printable material, to provide the 3D item comprising 3D printed material, wherein the 3D item comprises a plurality of layers of 3D printed material, wherein a first layer part of the one or more layers comprises at least two neighboring strands of 3D printed material, as described herein.

As indicated above, especially, the method comprises providing by 3D printing a first strand of first 3D printed material and a second strand of second 3D printed material neighboring to each other. However, the method especially further comprises also swapping during 3D printing at one or more first positions within the first layer part an arrangement of the strands relative to each other. Basically, in a cross-sectional view of the first layer part, there will be a plurality of positions where the two or more strands are available in a configuration of neighboring strands. Here, the term "configuration" especially refers to an order of the strands. For instance, when there are two strands A and B, the configurations can be AB or BA; when there are three strands, the configurations can ABC, BCA, CAB, ACB, BAC, and CBA. At a first position, however, the configuration changes from one another. At such first position, there can be a crossing of two or more strands. Alternatively, or additionally, at a first position, one layer is deposited over the other (while pressing the other at least partly away with the nozzle). Further, the term "first position" may also refer to a plurality of first position. This may lead to a plurality of different arrangements or configurations. This may be provided in a regular array of configurations or a random array of configurations.

To allow the strands to be arranged after the first position in another arrangement may especially imply that two or more strands should swap. As the strands are neighboring and will in general have essentially the same height (i.e. the layer height), measures may have to be taken to provide a swap wherein the layer height is essentially not changed. For instance, as already indicated above, one may push the other layer away, thereby locally reducing the layer height of the other strand, while at the same position also the layer height of the one strand may be reduced. It may also be possible that during printing of one of the strands, there is a short stop, leaving space for the next strand to be printed.

Hence, in embodiments one or more of the following may apply: (i) providing one of the strands with a reduced strand height (H1) at one or more future first positions, (ii) interrupting 3D printing of one of the strands at one or more future first positions, (iii) providing the other of the strands with a reduced strand height (H1) at one or more first positions, (iv) interrupting 3D printing of the other of the strands at one or more first positions, and (v) reducing the strand height (H1) of one of the strands at one or more first positions by compression when printing the other of the strands at the respective one or more first positions. Especially, in embodiments one or more of the following may apply (i) providing one of the strands with a reduced strand height (H1) at one or more future first positions, (iii) providing the other of the strands with a reduced strand height (H1) at one or more first positions, and (v) reducing the strand height (H1) of one of the strands at one or more first positions by compression when printing the other of the strands at the respective one or more first positions. Especially with the latter option, also the strand height of the other of the strands may be reduced. In this way, the layer height at the one or more first positions may essentially be identical with other positions (also indicated as second positions), where the strands are neighboring (and not swapping arrangement).

In embodiments, the method may comprise providing one or more crossings of at least two of the two or more strands at the respective one or more first positions. Hence, in specific embodiments the method may comprise crossing one of the strands at a plurality of first positions during 3D printing of the other of the strands.

In embodiments wherein while printing one of the strands another strand is reduced in height, this may especially be executed by printing the one strand while the others stand is not fully cooled down. Hence, the part of the other strand that may have to be reduced in height may still have a temperature of at least the glass transition temperature and/or at least the melting temperature. In embodiments, the part of the other strand that may have to be reduced in height may still have a temperature of at least the melting temperature. Hence, printing of the strands may especially essentially be done simultaneously. Hence, in embodiments the (3D printed) layers are created by essentially simultaneously printing the two or more strands. For instance, in embodiments one strand may not be ahead of the other strand with more than 20 times the strand width, such as not more ahead of the other strand more than 10 times the strand width. For instance, this may especially be achieved with a multi-nozzle printer (see also below). However, other embodiments may also be possible.

In specific embodiments, the method may at least comprise reducing the strand height (H1) of one of the strands at one or more first positions by compression when printing the other of the strands at the respective one or more first positions, wherein (the action of) printing the other of the strands at the respective one or more first positions may especially be done before a temperature of the 3D printed material of the one strand at the respective one or more first positions is below one or more of the melting temperature and glass temperature of the 3D printed material of the one strand.

Alternatively, or additionally, the method may comprise providing two or more of the at least two or more strands on top of one another at the respective one or more first positions, each having a reduced strand height. Hence, in specific embodiments the method may comprise providing two or more of the at least two or more strands on top of one another at the respective one or more first positions, each having a reduced strand height at a plurality of first positions during 3D printing of the other of the strands. Hence, the 3D printed item may comprise a plurality of first positions.

In embodiments, the strands have a strand height (H1) and a strand width (W1), wherein a distance (d11) between neighboring first positions within the same layer is selected from one or more of (i) d11>H1 and (ii) d11>W1. Note that the strand height for the two or more strands may differ but will in general be essentially the same. Further, the strand height of a strand may essentially be the same over the entire length of the strand in the first layer part, except for the first position(s). Further, note that the strand width for the two or more strands may differ, but will in general be essentially the same. Further, the strand width of a strand may essentially be the same over the entire length of the strand in the first layer part, except for the first position(s).

As indicated above, the strands are neighboring, and will in general have essentially the same height (i.e. the layer height). Note however that in specific other embodiments the strands may have different (strand) heights.

Especially, in embodiment the 3D item may be used for optical applications wherein it may be desirable that at least part of the 3D item is transmissive for visible light, be it natural light or artificial light. Hence, in specific embodiments at least one of the first 3D printed material and the second 3D printed material is transmissive for visible light. Hence, the 3D printable material (and thus 3D printed material) of at least one of the strands may be transmissive for visible light. More especially, the strands and strand materials of one of the strands may be chosen such that at least part of the visible light may be transmitted through the strand. Hence, a wall element comprising the one or more strands of light transmissive material may thus be transmissive for at least part of the visible light.

The phrase "at least part of the visible light" (which is essentially in the range of 380-780 nm) may refer to one or more of (i) that one or more wavelengths are transmitted and (ii) at such wavelengths less than 100% but more than 0%, such as at least 50% of the light may be transmitted. Hence, at least one of the 3D printable materials (and thus 3D printed material) is light transmissive thereby enabling light transmission from one of the surfaces (of the 3D item) to the other. In relation to the 3D printable materials and 3D printed materials, see also below.

In specific embodiment, the first 3D printed material and the second 3D printed material may (thus) differ in composition. The difference in composition may be based on a different on (thermoplastic) polymeric material (see also below) and/or a difference in filler material and/or a difference in filler material filling percentage. Especially, such difference may be based on a difference in filler material (see further also below).

For instance, in embodiments at least one of the first 3D printed material and the second 3D printed material is black, white, or colored. This may—amongst other—be due to the use of filler material or the use of different filler materials. Further, alternatively or additionally, at least one of the first 3D printed material and the second 3D printed material may be reflective. This may be achieved by using reflective filler materials. As indicted above, especially at least one of the strands may be light transmissive. However, such light transmissive strand may also be colored and/or include a reflective filler material. Nevertheless, the transmission of under perpendicular irradiation of the first layer of the 3D item may especially be in the order of at least 10%, such as at least 20%. In embodiments, the transmission of a light transmissive strand under perpendicular irradiation may be at least about 50%.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the 3D printable material comprises a 3D printable material selected from the group consisting of Urea formaldehyde, Polyester resin, Epoxy resin, Melamine formaldehyde, thermoplastic elastomer, etc. . . . . Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA). Alternatively, or additionally, one or more of polylactic acid (PLA), polybutylene terephthalate (PBT), and polyamide (PA) may be applied. The terms "3D printable material" or "3D printed material" may also refer to a plurality of different materials, such as PC+ABS, or PC+PBT.

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (aniso-tropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

As indicated above, at least one of the strands may comprise light transmissive (3D printed) material. Especially, the material has a light transmission in the range of 50-100%, especially in the range of 70-100%, for light having a wavelength selected from the visible wavelength range. Herein, the term "visible light" especially relates to light having a wavelength selected from the range of 380-780 nm. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). In specific embodiments, a material may be considered transmissive when the transmission of the radiation at a wavelength or in a wavelength range, especially at a wavelength or in a wavelength range of radiation generated by a source of radiation as herein described, through a 1 mm thick layer of the material, especially even through a 5 mm thick layer of the material, under perpendicular irradiation with said radiation is at least about 20%, such as at least 40%, like at least 60%, such as especially at least 80%, such as at least about 85%, such as even at least about 90%. The transmission of the light transmissive material (as such) for one or more luminescence wavelengths may be at least 80%/cm, such as at least 90%/cm, even more especially at least 95%/cm, such as at least 98%/cm, such as at least 99%/cm. This implies that e.g. a 1 cm$^3$ cubic shaped piece of light transmissive material, under perpendicular irradiation of radiation having a selected luminescence wavelength (such as a wavelength corresponding to an emission maximum of the luminescence of the luminescent material of the light transmissive material), will have a transmission of at least 95%. Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

The printable material is printed on a receiver item. Especially, the receiver item can be the building platform or can be comprised by the building platform. The receiver item can also be heated during 3D printing. However, the receiver item may also be cooled during 3D printing. The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. . . . . Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. . . . . Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

The method may especially be executed with a 3D printer comprising a plurality of printer nozzles. In this way, in a relatively fast way the strands may be printed consecutively or in specific embodiments even, during part of a 3D printing time, simultaneously. In alternative embodiments, the method may be executed with a 3D printer comprising a single printer nozzle. In both types of embodiments two (or more) extruder systems may be applied. When using more than one printer nozzle, essentially continuous 3D printing may be possible. When using a single printer nozzle, continuous 3D printing may not be possible.

Layer by layer printable material is deposited, by which the 3D printed item is generated (during the printing stage). The 3D printed item may show a characteristic ribbed structure (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one or more post processing actions may be executed after removing the printed item from the receiver item. Post processing may include e.g. one or more of polishing, coating, adding a functional component, etc. . . . . Post-processing may include smoothening the ribbed structures, which may lead to an essentially smooth surface.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein. Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided. Especially, the invention provides a 3D item comprising 3D printed material, wherein the 3D item comprises one or more layers of 3D printed material. Especially, a first layer part of the one or more layers comprises at least two strands of 3D printed material, wherein a first strand of first 3D printed material and a second strand of second 3D printed material are configured neighboring to each other. Further, in specific embodiments the first strand and the second strand have an arrangement relative to each other, wherein the first layer part comprises one or more first positions, wherein the arrangements of the first strand and the second strand relative to each other at both sides of a respective first position are different. As indicated above, at both sides of such first positions (or change position) the configurations differ. Further, in specific embodiments at least one of the first 3D printed material and the second 3D printed material is transmissive for visible light. The strands may have average length axes which may be configured parallel. The average length axis may be essentially parallel to an average layer axis.

Hence, especially the invention provides embodiments of the 3D item, wherein the 3D item comprises 3D printed material, wherein the 3D item comprises one or more layers of 3D printed material, wherein a first layer part of the one or more layers comprises a first strand of 3D printed material in a first plane and a second strand of second 3D printed material in a second plane, at least one of the first 3D printed material and the second 3D printed material being transmissive for visible light, wherein, at a plurality of positions in a cross-sectional view parallel to the first plane and the second plane, the first strand and the second strand have an arrangement relative to each other, or a configuration wherein the first strand and the second strand are next to each other, either in direct contact or at a non-zero distance, wherein the first layer part comprises one or more first positions, and wherein the configurations of the first strand and the second strand relative to each other at both sides of a respective first position are different.

The 3D printed item may comprise a plurality of layers on top of each other, i.e. stacked layers. The width (thickness) and height of (individually 3D printed) layers may e.g. in embodiments be selected from the range of 100-5000 μm, such as 200-2500 μm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated above when discussing the method. Below, some specific embodiments in relation to the 3D printed item are discussed in more detail.

As indicated above, in embodiments at least one of the strands (in the plane of the strands) has a block-shape, a zig-zag shape, or a meandering shape. Also, two or more shapes may be combined (e.g. like a trapezium). Further, in embodiments two or more of the at least two strands (in the plane of the strands) may have a shape individually selected from a block-shape, a zig-zag shape, and a meandering shape. Also, two or more shapes may be combined for one of the strands, or for two or more of the at least two strands (wherein the combination may in embodiments be individually selected).

In specific embodiments, one or more of the following applies: (i) one of the strands has a reduced strand height (H1) at one or more first positions, (ii) one of the strands is interrupted at one or more first positions, (iii) the other of the strands has a reduced strand height (H1) at one or more first positions, and (iv) the other of the strands is interrupted at one or more first positions. Especially, in embodiments (i)

one of the strands has a reduced strand height (H1) at one or more first positions, and/or (iii) the other of the strands has a reduced strand height (H1) at one or more first positions. Yet even more especially, both (i) one of the strands has a reduced strand height (H1) at one or more first positions, and (iii) the other of the strands has a reduced strand height (H1) at one or more first positions.

Further, in embodiments at least one of the first 3D printed material and the second 3D printed material may be reflective for visible light. Alternatively, at least one of the first 3D printed material and the second 3D printed material is black, white, or colored. In embodiments, two of the at least two strands are configured at a non-zero distance (d1) of each other at one or more second positions. Of course, more than one set of two strands of the at least two strands may include strands that are configured at a non-zero distance. Alternatively, or additionally, two of the at least two strands are configured in physical contact (at zero distance (d1)) of each other at one or more second positions. Of course, more than one set of two strands of the at least two strands may include strands may be configured in physical contact. In specific embodiments, the first strand and the second strand are configured in average parallel to each other. In embodiments, when there are more than two strands, two or more of these strands may be configured in average parallel to each other. Hence, in embodiments (of the 3D item) one or more of the following applies: (i) at least one of the first 3D printed material and the second 3D printed material is reflective for visible light, (ii) at least one of the first 3D printed material and the second 3D printed material is black, white, or colored, and (iii) two of the at least two strands are configured at a non-zero distance (d1) of each other at one or more second positions.

As can be derived from the above, in embodiments the first 3D printed material and the second 3D printed material may differ in composition. When there are more than two 3D printed materials, in more than two strands, at least two of these may differ in composition.

A 3D printed item may comprise a plurality of layers. One or more of the layers, such as a subset of the total number of layers, may comprise a first layer part comprising one or more first positions, wherein the arrangements of the first strand and the second strand relative to each other at both sides of a respective first position are different. Likewise, this may be the case when more than two strands are available in a layer part. Especially, a plurality of the layers, or a plurality of layer parts in different layers may each comprise a first layer part comprising one or more first positions, wherein the arrangements of the first strand and the second strand relative to each other at both sides of a respective first position are different. Layers with two or more strands may alternate with layers based on a single strand. Sets of two or more layers with each two or more strands may alternate with layers based on a single strand.

The (with the herein described method) obtained 3D printed item may be functional per se. For instance, the 3D printed item may be a lens, a collimator, a reflector, etc. . . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. . . . . The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. . . . . . Alternatively, or additionally, the functional component may comprise a thermal component (e.g. configured to cool or to heat an electrical component). Hence, the functional component may be configured to generate heat or to scavenge heat, etc.

As indicated above, the 3D printed item may be used for different purposes. Amongst others, the 3D printed item may be used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. . . . . In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material as described herein. Especially, in yet a further aspect the invention also provides a fused deposition modeling 3D printer, comprising (a) two or more printer heads, each comprising a printer nozzle, and (b) a 3D printable material providing device configured to provide two or more different types of 3D printable material to the respective printer heads, wherein the fused deposition modeling 3D printer is configured to provide said 3D printable material as described herein.

In an alternative aspect the invention also provides a fused deposition modeling 3D printer, comprising (a) a single printer head comprising a printer nozzle, and (b) a 3D printable material providing device configured to provide two or more different types of 3D printable material to the respective printer heads, wherein the fused deposition modeling 3D printer is configured to provide said 3D printable material as described herein. The 3D printable material providing device may comprise two or more extruder systems for the two or more different 3D printable materials.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, as described herein. Especially, in yet a further aspect the invention also provides a fused deposition modeling 3D printer, comprising (a) two or more printer heads, each comprising a printer nozzle, and (b) a 3D printable material providing device configured to provide two or more different types of 3D printable material to the respective printer heads, wherein the fused deposition modeling 3D printer is configured to provide said 3D printable material as described herein. In an alternative aspect the invention also provides a fused deposition modeling 3D printer, comprising (a) a single printer head comprising a nozzle, and (b) a 3D printable material providing device configured to provide two or more different types of 3D printable material to the respective printer heads, wherein the fused deposition modeling 3D printer is configured to provide said 3D printable material as described herein. The 3D printable material providing device may comprise two or more extruder systems for the two or more different 3D printable materials.

Especially, the 3D printer may comprise a controller (or is functionally coupled to a controller) that is configured to execute in a controlling mode (or "operation mode") the method as described herein. Instead of the term "controller" also the term "control system" (see e.g. above) may be applied.

The term "controlling", and similar terms especially refer at least to determining the behavior or supervising the running of an element. Hence, herein "controlling" and similar terms may refer to imposing behavior to the element (determining the behavior or supervising the running of an element), such as measuring, displaying, actuating, opening, shifting, and changing temperature. Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an app on a device, such as a portable device, for example a smartphone or a tablet. The device is thus not necessarily coupled to the lighting system but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

In yet a further aspect, the invention also provides a lighting device comprising the 3D item as defined herein, wherein the 3D item is configured as one or more of (i) at least part of a lighting device housing, (ii) at least part of a wall of a lighting chamber, and (iii) an optical element. As indicated above, at least one of the first 3D printed material and the second 3D printed material is transmissive for visible light. Hence, the 3D item may be transmissive for part of the visible light. For instance, in this way of at least part of a lighting device housing transmissive for visible light may be provided and/or at least part of a wall of a lighting chamber may be provided that is transmissive for visible light.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a to 3c schematically depict an embodiment;

The schematic drawings are not necessarily to scale.

DETAILED DESCRIPTION OF THE EMBODIMENTS

Figure 1A:
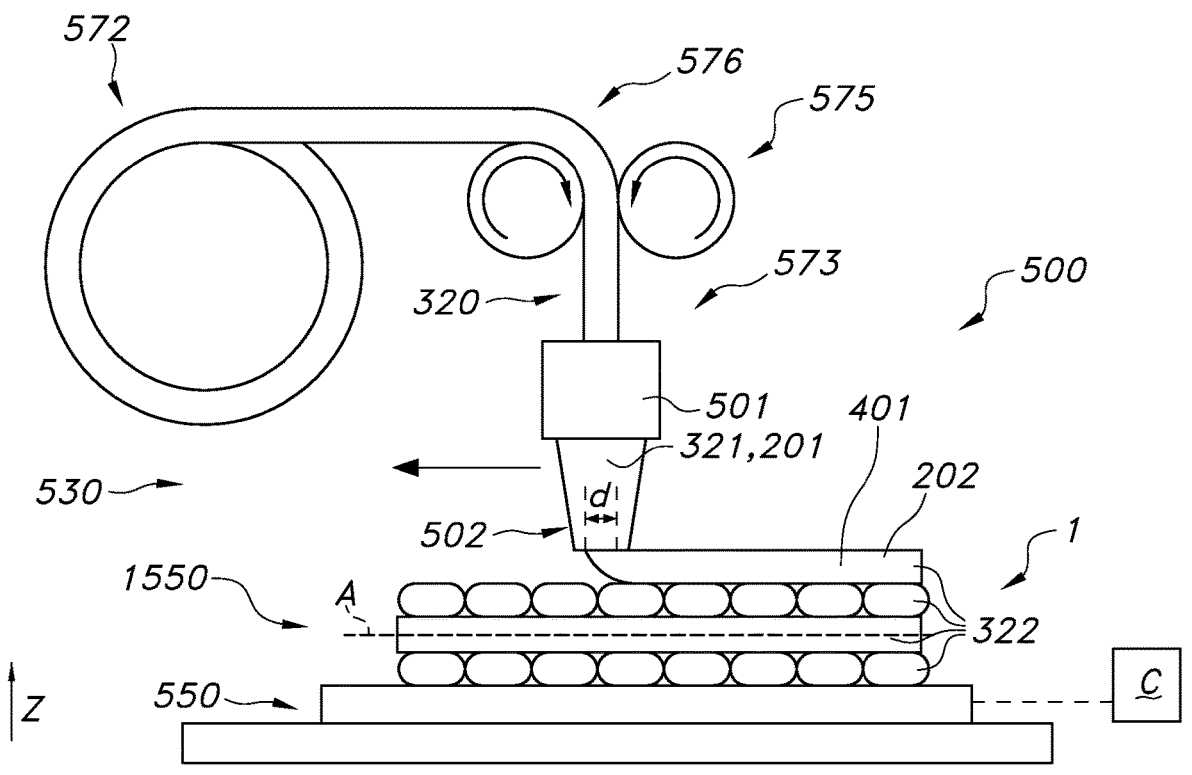
FIGS. 1a to 1c schematically depict a 3D printer and of a 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle (or nozzle opening). The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layers 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573 and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322 and/or layer 322t on layer 322, a 3D item 1 may be formed. Reference 575 indicates the filament providing device, which here amongst others include the spool or roller and the driver wheels, indicated with reference 576.

Reference A indicates a longitudinal axis or filament axis. Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively, or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference d indicates the diameter of the nozzle (through which the 3D printable material 201 is forced). Note that the nozzle is not necessarily circular.

Figure 1B:
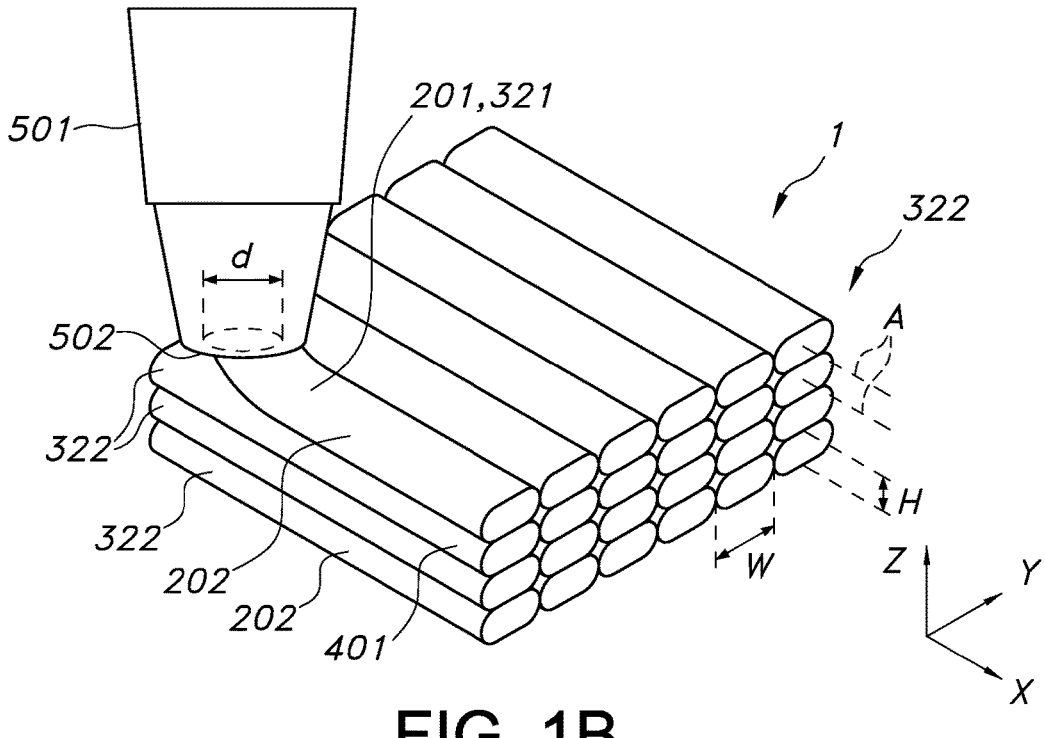

FIG. 1b schematically depicts in 3D in more detail the printing of the 3D item 1 under construction. Here, in this schematic drawing the ends of the filaments 321 in a single plane are not interconnected, though in reality this may in embodiments be the case.

Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
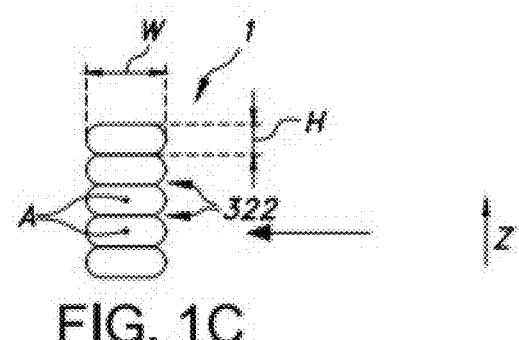

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated. FIG. 1c very schematically depicts a single-walled 3D item 1.

Figure 2A:
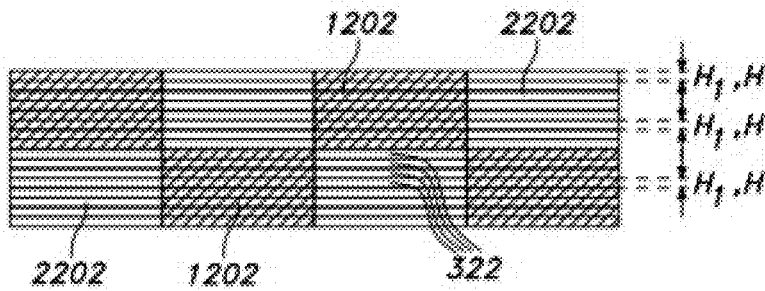
FIGS. 2a and 2b schematically depict a reference example.
Figure 2B:
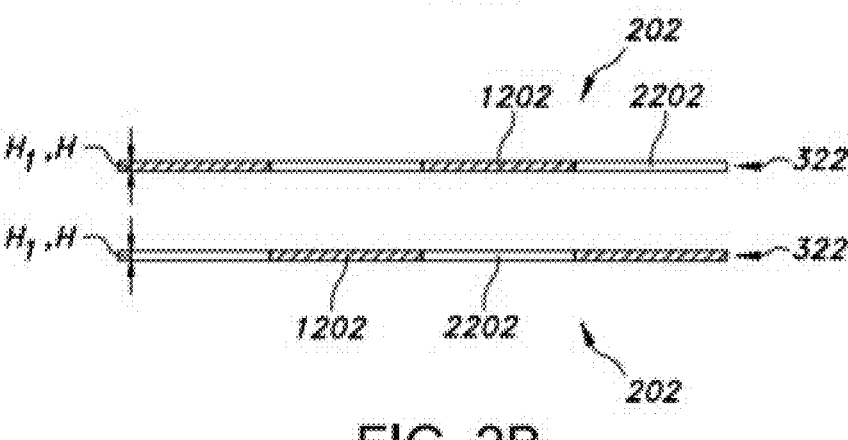

Amongst others, herein we suggest a simple printing method making use of at least two materials for obtaining surface textures and attractive appearance. During printing for example of an object using two colors, nozzles printing different colors continuously start and stop printing at different locations to print the desired colors in the same layer. This is then repeated going from one layer to the other to produce a pattern as shown in FIGS. 2a-2b. This cost time and changing colors induce defects. Furthermore, making small patterns is difficult.

Here, references 1202 and 2202 refer to first 3D printed material and second 3D printed material, respectively. FIG. 2a schematically depicts a wall element with 8 areas. These areas have been created by providing layers 322 which alternatingly comprise to first 3D printed material 1202 and second 3D printed material 2202, respectively. These have been alternated in such a way, that a kind of checkered pattern has been created. FIG. 2b schematically depicts two of the layers 322, one selected from the upper part, and one selected from the lower part. Reference H indicates the layer height. Here, all layer heights of all layers and all layer parts having alternatingly comprise to first 3D printed material 1202 and second 3D printed material 2202 have been chosen the same.

However, amongst others herein we suggest a simple printing method where for example when printing two colors, the colors are printed in alternating layer continuously. Furthermore, the design is in embodiments chosen such that layers cross each other so that the color 1 which needs to be on the front surface is brought to the front while where the other color 2 needs to be on the surface then the color 1 is hidden behind color 2 as shown in FIG. 3a-3b. Using this strategy relatively small patterns as well as complex patterns can be produced.

FIG. 3a schematically depicts a wall element with 8 areas. Note that in this embodiment the wall essentially consists of a plurality of neighboring strands, defining two neighboring wall parts which define the wall element. Hence, each layer comprises at least two strands. FIG. 3b schematically depicts two of the layers 322, one selected from the upper part, and one selected from the lower part. Reference H1 indicates the layer height of the respective strands (see further below). Here, all layer heights of all layers and all layer parts having alternatingly comprise to first 3D printed material 1202 and second 3D printed material 2202 have been chosen the same. FIGS. 3a-3b show an embodiment of a 3D item obtainable by a method for producing the 3D item 1 by means of fused deposition modelling, wherein the method comprises a 3D printing stage comprising layer-wise depositing 3D printable material to provide the 3D item 1 comprising 3D printed material 202 (on a receiver item (not shown)). The 3D item 1 comprises one or more layers 322 of 3D printed material 202. A first layer part 1322 of the one or more layers 322 comprises at least two neighboring strands 231,232 of 3D printed material 202. Here, essentially all layers consist of such first layer parts 1322, but this is not necessarily the case. Such method may comprise: providing by 3D printing a first strand 231 of first 3D printed material 1202 and a second strand 232 of second 3D printed material 2202 neighboring to each other, while swapping during 3D printing at one or more first positions 236 within the first layer part 1322 an arrangement of the strands 232,231 relative to each other. Hence, FIGS. 3a-3b show an embodiment of a 3D item 1 comprising 3D printed material 202, wherein the 3D item 1 comprises one or more layers 322 of 3D printed material 202. A first layer part 1322 of the one or more layers 322 comprises at least two strands 231,232 of 3D printed material 202. A first strand 231 of first 3D printed material 1202 and a second strand 232 of second 3D printed material 2202 are configured neighboring to each other. The first strand 231 and the second strand 232 have an arrangement relative to each other. The first layer part 1322 comprises one or more first positions 236, wherein the arrangements of the first strand 231 and the second strand 232 relative to each other at both sides of a respective first position 236 are different.

Especially, at least one of the first 3D printed material 1202 and the second 3D printed material 2202 is transmissive for visible light. This may provide a light transmissive 3D item, such as a wall element that is transmissive for visible light.

FIG. 3c schematically depicts several cross-sections. In these cross-sections, it is assumed that the top view of FIG. 3b is a top view of a stack of two layers. In cross-section I, two strands on top of each other, defining each a part of the two layers, are shown. At the first position 236, the strands are swapped (for each layer). Hence, in cross-section II, four parts are shown, with the two lower parts defined by the swapping strands of the lower layer, and the two upper parts defined by the swapping of the strands of the upper lower. For maintaining layer height, the height of the strands at the first position 236 is reduced. Cross-section III shows the strands at the other side of the first position 236.

Reference A1 indicates the average length axes of the strands.

A number of shapes is possible. A non-limiting number of providing the strands 231,232 may be in one or more of a block-shape way, a zig-zag way, or in a meandering way. FIGS. 3a-3c show examples of a block-shape way. Actually, the two (or more) strands 231,232 may be provided in a way individually selected from a block-shape way, a zig-zag way, and a meandering way.

FIGS. 3a-3c also shows embodiments of the result of a method comprising providing the strands 231,232 (within the same layer 322) at a non-zero distance d1 of each other at one or more second positions 237. However, it may also be possible to use a method comprising providing the strands 231,232 in physical contact with each other at one or more second positions 237 (i.e. d1=0 mm).

As indicated above, one or more of the following may apply: (i) providing one of the strands 231,232 with a reduced strand height H1 at one or more future first positions 236, (ii) interrupting 3D printing of one of the strands 231,232 at one or more future first positions 236, (iii) providing the other of the strands 232,231 with a reduced strand height H1 at one or more first positions 236, (iv) interrupting 3D printing of the other of the strands 232,231 at one or more first positions 236, and (v) reducing the strand height H1 of one of the strands 231,232 at one or more first positions 236 by compression when printing the other of the strands 232,231 at the respective one or more first positions 236. Hence, one or more of the following may apply: (i) one of the strands 231,232 has a reduced strand height H1 at one or more first positions 236, (ii) one of the strands 231,232 is interrupted at one or more first positions 236, (iii) the other of the strands 232,231 has a reduced strand height H1 at one or more first positions 236, and (iv) the other of the strands 232,231 is interrupted at one or more first positions 236.

Herein, sometimes the phrases "one of the strands 231, 232" and "the other of the strands 232,231", and similar phrases, are applied. Here, the numbers are interchanged in the respective phrase, to indicate that either the one and the other are the strands indicated with 231 and 232, respectively, or the one and the other are the strands indicated with 231 and 231, respectively. When 231 refers the one of the strands, 232 refers to the other of the strands. Similarly, this may apply to layers or layer parts essentially defined by more than two strands.

Referring to e.g. FIGS. 3a-3c, such embodiments may be the result of a method comprises crossing one of the strands 231,232 at a plurality of first positions 236 during 3D printing of the other of the strands 232,231.

The strands 231,232 may have a strand height H1 and a strand width W1. In embodiments, a distance d11 between neighboring first positions 236 within the same layer 322 may be selected from one or more of $H1 \leq d11 \leq 20*H1$ and $W1 \leq d11 \leq 20*W1$. However, as indicated above, d11 may also be 0 mm. Further, in embodiments d11 may also be larger than 20*H1.

Reference d11 *h* especially refers to a heart to heart distance. Reference d1 refers to a distance between the strands (i.e. a distance between the 3D printed materials of the respective strands. Hence, d1 is especially not a heart to heart distance. Distance d11 may in embodiments be parallel to an average length axis (or both axes), and distanced d1 may in embodiments be perpendicular to an average length axis (or both axes).

As shown in FIGS. 3a-3c, the first strand 231 and the second strand 232 are configured in average parallel to each other.

The 3D printable material 201 and the 3D printed material 202 may comprise one or more of polycarbonate PC, polyethylene PE, high-density polyethylene HDPE, polypropylene PP, polyoxymethylene POM, polyethylene naphthalate PEN, styrene-acrylonitrile resin SAN, polysulfone PSU, polyphenylene sulfide PPS, and semi-crystalline polyethylene terephthalate PET, acrylonitrile butadiene styrene ABS, polymethyl methacrylate PMMA, polystyrene PS, and styrene acrylic copolymers SMMA. However, other materials may also be possible (see also above). Especially, the first 3D printed material 1202 and the second 3D printed material 2202 differ in composition. In embodiments, at least one of the first 3D printed material 1202 and the second 3D printed material 2202 is black, white, or colored. Further, in embodiments at least one of the first 3D printed material 1202 and the second 3D printed material 2202 is reflective.

FIGS. 4a-4d show embodiments wherein at least one of the strands 231,232 (in the plane of the strands 231,232) has a zig-zag shape. More especially, the two (or more) of the strands 231,232 (in the plane of the strands 231,232) has a zig-zag shape.

Figures 4A, 4B, 4C, 4D:
FIGS. 4a to 4f schematically depict several embodiments and aspects.

FIGS. 4a and 4c schematically depict top views, again assuming that the top views of FIGS. 4a and 4c are a top view of each a stack of two layers. FIGS. 4b and 4d are respective cross-sections. From the cross-sections it can be deduced that for the embodiment of FIGS. 4a-4b applies: (i) one of the strands 231,232 has a reduced strand height H1 at one or more first positions 236, and (iii) the other of the strands 232,231 has a reduced strand height H1 at one or more first positions 236. From the cross-sections it can also be deduced that for the embodiment of FIGS. 4c-4d applies: (ii) one of the strands 231,232 is interrupted at one or more first positions 236, and (iv) the other of the strands 232,231 is interrupted at one or more first positions 236. Of course, the mentioned first positions refer to different first positions. FIG. 4d schematically depict some cross-sections of the embodiment schematically depicted in FIG. 4c.

Referring to some of the preceding embodiments, when there are two strands A and B, the configurations can be AB or BA.

Figures 4E, 4F:
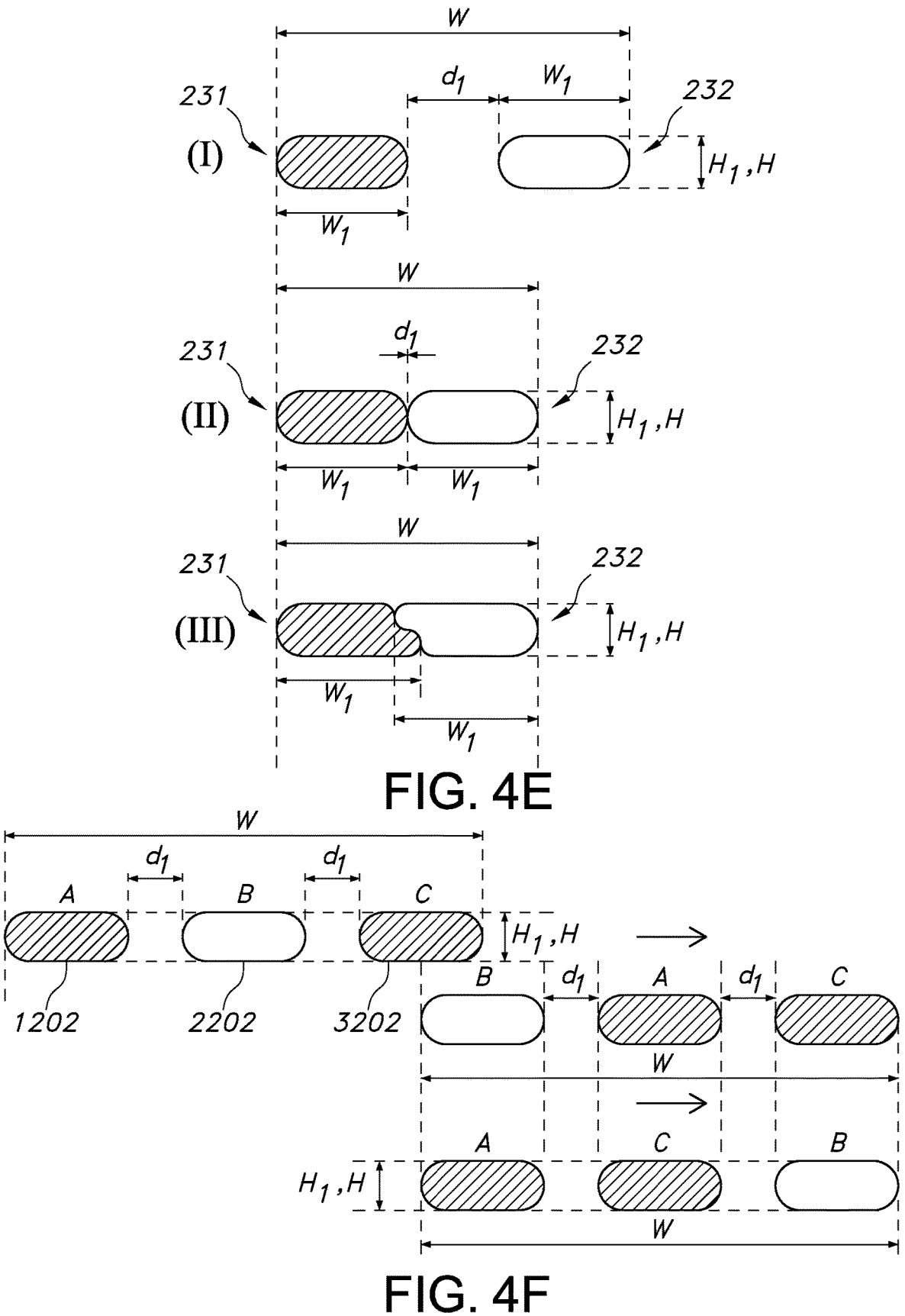

FIG. 4e schematically depict some further aspects, wherein the strands are neighboring with a non-zero distance d1 (I), touching each other with an essentially zero distance d1 (II), or even at least partially overlapping, also with an essentially zero distance (III). Referring to FIG. 4e, it can be derived that a layer width W, a layer height H are defined by the at least two strands 231 and 232. Hence, the phrase "neighboring to each other" may thus include in physical contact or at some distance.

FIG. 4f schematically depicts an embodiment wherein a layer comprises three strands. The strands may comprise different materials 1202, 2202, and 2302, respectively. Here, the strands are chosen to have the same strand heights H1 and strands widths. The distances between the strands is indicated with reference d1. The layer height H and the layer width W are defined by the two or more strands. With references A, B and C, the different strands are indicated. Here, an embodiment is shown with different configurations of the three strands. Of course, more than three strands may also be possible.

Figure 5:
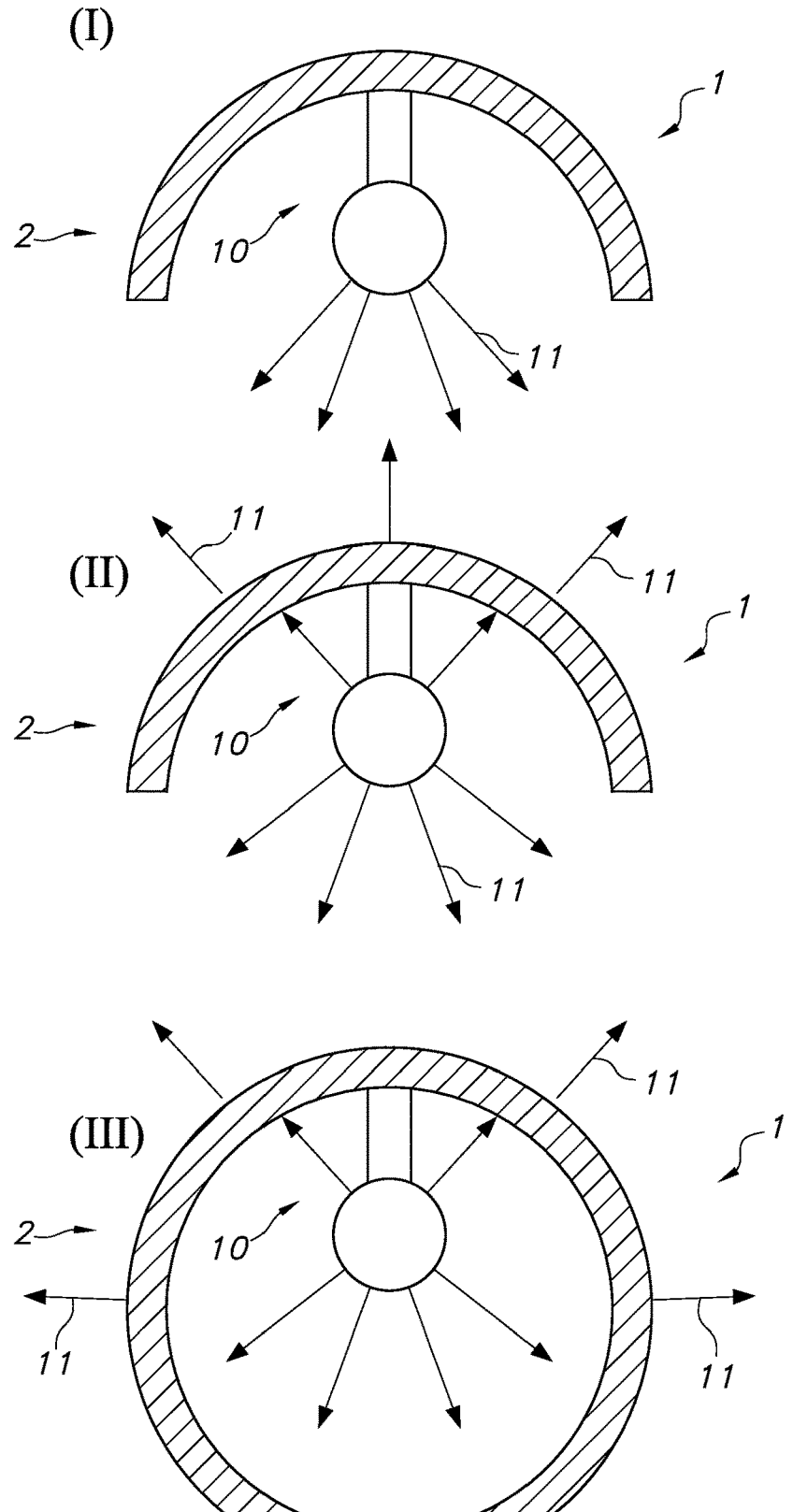
FIG. 5 schematically depicts applications.

FIG. 5 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item may e.g. be a housing or shade. The housing or shade comprises the item part 400. For possible embodiments of the item part 400, see also above. FIG. 5 schematically depict several embodiments, wherein in the first embodiment I, the transmissivity of the 3D item 1 is relatively small, and in the other embodiments II and III, the transmissivity is larger.

Figure 6:
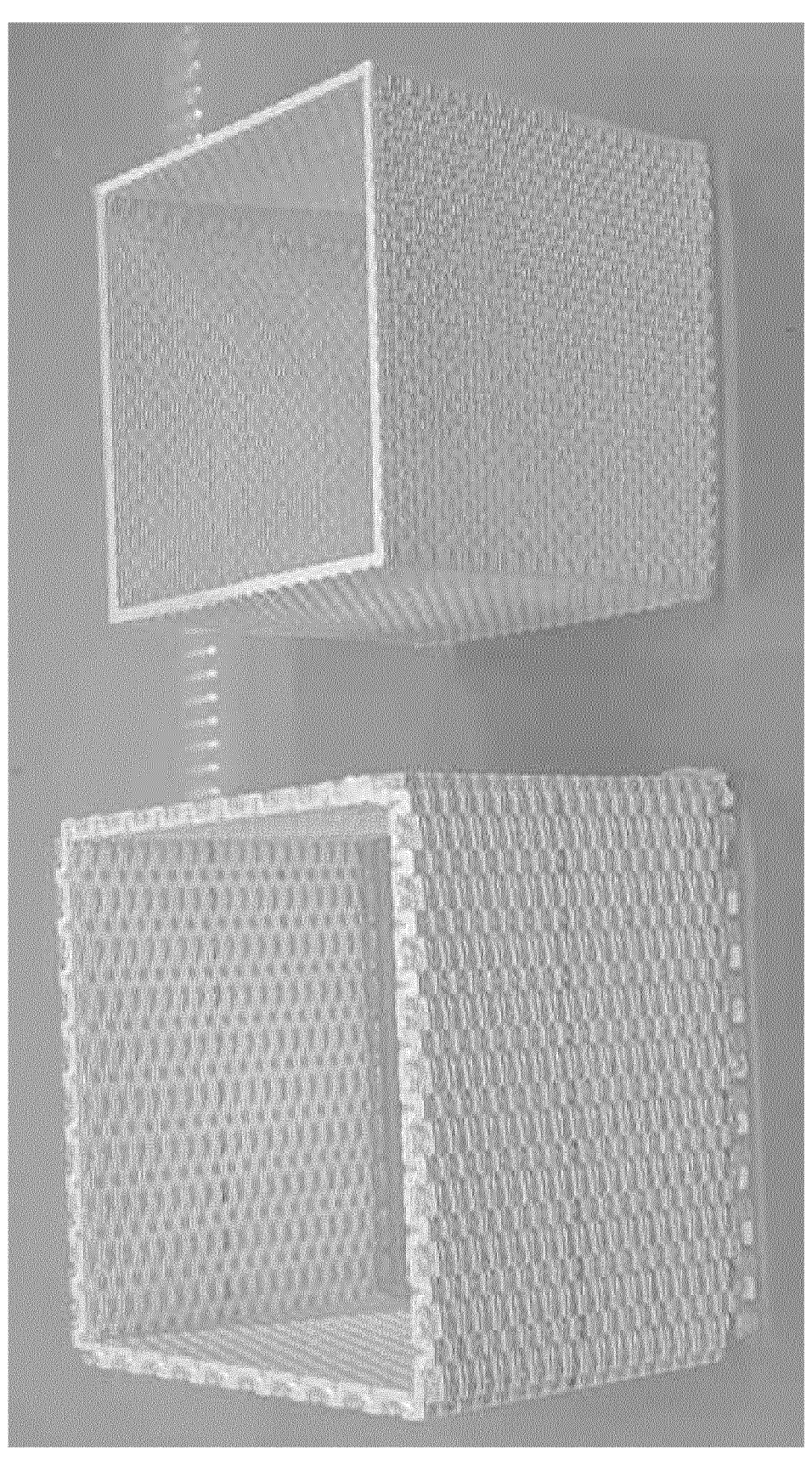
FIG. 6 depicts an example of a 3D item.
Figure 7:
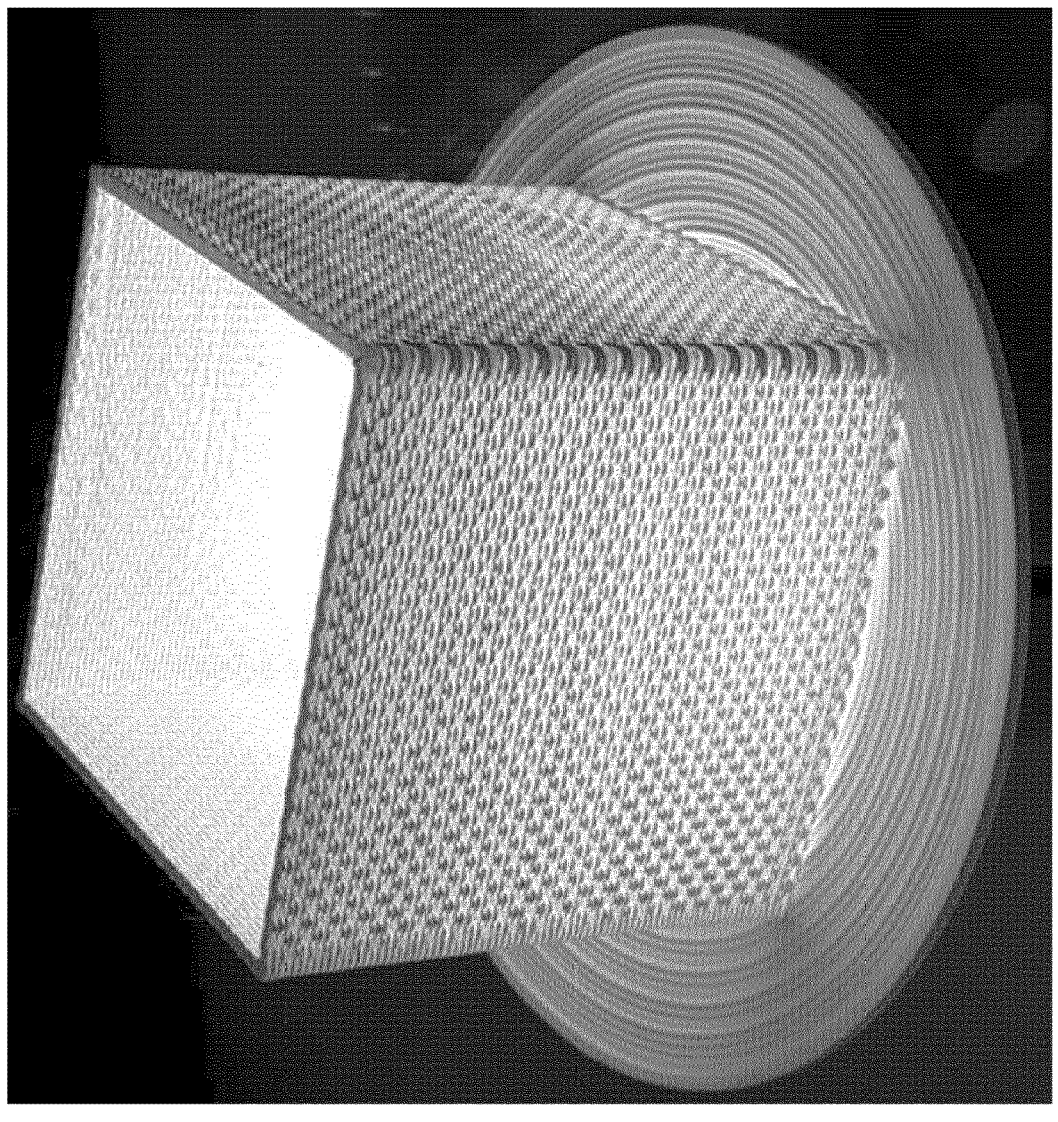
FIG. 7 depicts an example of a 3D item.

FIGS. 6-7 depicts examples of 3D items, which can e.g. be uses as a kind of lamp shades. It is clear that the 3D items are transmissive for light due to the openings in the walls (or wall elements).

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

Hence, amongst others the invention provides a method wherein single layers of a wall element, consist of two (or more) strands. One of the strands is located at one side of the layer and another one of the strands is arranged at the other side of the layer. However, at one or more positions these sides may be changed. In this way, e.g. color, reflectivity, transmissivity, and or other optical properties may be controlled. Further, a strong(er) layer may be obtained. Printing becomes more flexible, as the two strands may essentially be printed continuously. There will thus be change positions within the layer where one strand is over the other, or vice versa. In order not to increase layer thickness (at those change positions), as all strands are within the same layer, at the change positions the layer thickness of the strands may be decreased. In specific embodiments, there may be a temporary stop during printing of one of the strands at the change position to provide space for the future strand. A kind of woven structure may be obtained, which may also provide strength. Especially, one of the strands may be transmissive for visible light. This may provide a light transmissive single layer, or a light transmissive wall element.

The invention claimed is:

1. A method for producing a 3D item (1) on a receiver plate having an x-y plane by means of fused deposition modelling, the 3D item comprising one or more layers of 3D printed material, a first layer part of the one or more layers comprising a first strand of first 3D printed material in a first plane and a second strand of second 3D printed material in a second plane, the first plane and the second plane being parallel to the x-y-plane of the receiver plate, at least one of the first 3D printed material and the second 3D printed material being transmissive for visible light,
    wherein the method comprises a 3D printing stage comprising layer-wise depositing 3D printable material to provide the 3D item,
    wherein, during the 3D printing stage, the first strand of first 3D printed material and the second strand of second 3D printed material are deposited so that at a plurality of positions in a cross-sectional view parallel to the first plane and the second plane, the first strand and the second strand are available in a configuration wherein the first strand and the second strand are next to each other, either in direct contact or at a non-zero distance,
    wherein, at one or more first positions, the arrangement of the first strand and the second strand is swapped relative to each other during 3D printing, wherein at the one or more first positions, four parallel strands of two layers are used to enable the swap.

2. The method according to claim 1, comprising providing at least one of the first and second strands in a block-shape way, in a zig-zag way, or in a meandering way.

3. The method according to claim 1, comprising providing the first and second strands in a way individually selected from a block-shape way, a zig-zag way, and a meandering way.

4. The method according to claim 1, comprising providing the first and second strands at a non-zero distance of each other at one or more second positions.

5. The method according to claim 1, wherein one or more of the following applies: (i) providing one of the first and second strands with a reduced strand height (H1) at one or more first positions, (ii) interrupting 3D printing of one of the first and second strands at one or more first positions, (iii) providing the other of the first and second strands with a reduced strand height at one or more first positions, (iv) interrupting 3D printing of the other of the first and second strands at one or more first positions, and (v) reducing the strand height (H1) of one of the first and second strands at one or more first positions by compression when printing the other of the first and second strands at the respective one or more first positions.

6. The method according to claim 5, wherein the method at least comprises (v) reducing the strand height of one of the strands at one or more first positions by compression when printing the other of the strands at the respective one or more first positions, wherein printing the other of the strands at the respective one or more first positions is done before a temperature of the 3D printed material of the one strand at the respective one or more first positions is below one or more of the melting temperature and glass temperature of the 3D printed material of the one strand.

7. The method according to claim 1, wherein the first 3D printed material and the second 3D printed material differ in composition.

8. The method according to claim 1, wherein the first strand and the second strand are configured in average parallel to each other.

9. The method according to any claim 8, wherein at least one of the first 3D printed material and the second 3D printed material is black, white, or colored.

10. The method according to claim 1, wherein, at one or more first positions within the first layer part, the configuration of the first strand and the second strand changes from a first configuration to a second configuration.

* * * * *